(12) United States Patent
Zhang et al.

(10) Patent No.: US 11,935,268 B2
(45) Date of Patent: Mar. 19, 2024

(54) CONSTRUCTION METHOD AND SYSTEM FOR VISIBLE NEAR-INFRARED SPECTRUM DICTIONARY

(71) Applicant: HUAZHONG UNIVERSITY OF SCIENCE AND TECHNOLOGY, Hubei (CN)

(72) Inventors: Tianxu Zhang, Hubei (CN); Xin Zhou, Hubei (CN); Wandong He, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/298,258

(22) Filed: Apr. 10, 2023

(65) Prior Publication Data
US 2023/0326083 A1    Oct. 12, 2023

(30) Foreign Application Priority Data
Apr. 12, 2022 (CN) .......................... 202210378310.1

(51) Int. Cl.
    *G06T 7/90*      (2017.01)
    *G01J 3/28*      (2006.01)

(52) U.S. Cl.
    CPC .............. *G06T 7/90* (2017.01); *G01J 3/2823* (2013.01)

(58) Field of Classification Search
CPC .. G06T 7/90; G01J 3/28; G01J 3/2823; G06V 30/18105; G06V 10/56; G06V 30/19107; G06V 30/19173; G06F 16/5838; G06F 18/24; G06F 16/285
See application file for complete search history.

(56) References Cited

U.S. PATENT DOCUMENTS

| 2021/0075978 A1* | 3/2021 | Sowa ..................... G01J 3/2823 |
| 2023/0229401 A1* | 7/2023 | Lyden ..................... H03M 7/00 |
| | | 717/114 |

\* cited by examiner

*Primary Examiner* — Duy M Dang
(74) *Attorney, Agent, or Firm* — Hamre, Schumann, Mueller & Larson, P.C.

(57) ABSTRACT

A construction method and system for a visible near-infrared spectrum dictionary is provided. The method includes: constructing a four-primary color chromaticity cone by using normalized spectral response curves of four primary colors of a visible light camera as spectral basis functions; performing weighted combination on the spectral basis functions and forming an initial visible near-infrared spectrum dictionary; acquiring points on the four-primary color chromaticity cone on the basis of the initial visible red infrared spectrum dictionary according to different spectral resolutions and performing discretization, and forming words in the initial visible near-infrared spectrum dictionary; clustering chromaticity coordinates corresponding to the words into different groups, performing weighted combination on multi-scale spectral response curves corresponding to different group types, generating phrases or sentences in the dictionary, and generating a final visible near-infrared spectrum dictionary. The visible near-infrared spectrum dictionary can support a novel computational spectrometry imaging spectrometer.

10 Claims, 4 Drawing Sheets

---

Construct a visible near-infrared chromaticity cone on the basis of a chromaticity theory

▼

Construct a visible near-infrared spectrum dictionary

▼

Construct a visible near-infrared computational spectrometry model, and calculate a visible near-infrared spectrum according to target pixels

CONSTRUCTION METHOD AND SYSTEM FOR VISIBLE NEAR-INFRARED SPECTRUM DICTIONARY

TECHNICAL FIELD

The present invention pertains to the crossing fields of chromaticity theories, photoelectric sensors, computational informatics, target background characteristics, and target identification, and more particularly, to a method and system for constructing a visible near-infrared spectrum dictionary.

BACKGROUND ART

Existing imaging spectrometers are mainly classified into two systems: spectroscopic and Fourier interferometric. For spectroscopic imaging spectrometers, due to the limitations of the system, the higher the spectral resolution, the finer the spectral resolution is on the time axis N spectra), and the light energy acquired by the sensor and the signal-to-noise ratio of the sensor are low, and the probing distance is reduced. Under the same conditions, for Fourier interferometric imaging spectrometers, due to the large luminous flux, the signal-to-noise ratio thereof is $\sqrt{N}$ times greater than that of the spectroscopic imaging spectrometers, and the probing distance thereof is greater than that of the spectroscopic imaging spectrometers. However, the system is complex. If an entire scene is subjected to Fourier interferometric spectrometry, the amount of calculation is large, and it is difficult to acquire a spectral cube image of a dynamic target in real time. As a result, these imaging spectrometers are mostly used in laboratories to acquire and analyze spectra of substances, are mostly used to process static objects when used for out-field remote sensing, and can hardly deal with dynamic targets. Hence, the above-described imaging spectrometers of the two systems are not suitable for performing real-time spectrum acquisition for a distant moving target or a dynamic phenomenon. Computational spectrometry imaging techniques require two steps, i.e., sensing and encoding a scene, and reconstructing spectral data. Encoding is performed spatially and spectrally by means of light field sensing, and different spectral data reconstruction methods are present in correspondence with different encoding methods. In addition, computational spectrometry bands of existing computational spectrometry imaging techniques are extremely narrow.

A moving target is in a complex earth/space background, and information thereof is transient, like looking for a needle in a big haystack. If a load only passively acquires raw data and transmits the data to a base station, and the data is processed by the base station on the ground, by that time, the moving target has moved away long ago. In the case of a plurality of moving targets, the problem is even more severe. A large amount of useless data is present, but the amount of useful data is too small, or is even zero. In addition, out-of-date data is present.

SUMMARY OF THE INVENTION

In view of the defects of the prior art, an objective of the present invention is to provide a construction method and system for a visible near-infrared spectrum dictionary, so as to solve the following problems: existing imaging spectrometers employ different light field sensing methods to perform encoding spatially and spectrally, resulting in different spectral data reconstruction methods; in addition, computational spectrometry bands of existing computational spectrometry imaging techniques are extremely narrow, so that the existing imaging spectrometers are not suitable for performing real-time spectrum acquisition for a distant moving target or a dynamic phenomenon.

To achieve the above objective, according to an aspect, provided in the present invention is a construction method for a visible near-infrared spectrum dictionary, comprising the following steps:

S1: constructing a four-primary color chromaticity cone by using normalized spectral response curves of four primary colors of a visible light camera as spectral basis functions, wherein the four primary colors comprise: blue, green, red, and near-infrared, and each point in the four-primary color chromaticity cone is acquired by computing a weighted sum of the spectral basis functions;

S2: forming, on the basis of various light field energies acquired by the visible light camera, a generalized color vision for different stimulus values generated by blue, green, red, and near-infrared sensitive elements of the visible light camera; performing weighted combination on the spectral response curves of the four primary colors of the visible light camera, and forming an initial visible near-infrared spectrum dictionary, wherein the weighted combination may be linear or non-linear;

S3: acquiring points on the four-primary color chromaticity cone according to different spectral resolutions and performing discretization, constructing multi-scale spectrum curves of the visible light camera, and forming words in the initial visible near-infrared spectrum dictionary, i.e., the words in the spectrum dictionary being discretized points of the chromaticity cone, wherein the scale size is a change in the spectral resolution; and S4: clustering chromaticity coordinates generated by means of discretization performed according to the different spectral resolutions into different groups, performing weighted combination on multi-scale spectral response curves corresponding to the chromaticity coordinates of different group types to generate phrases or sentences in the dictionary, adding the same to the initial visible near-infrared spectrum dictionary, and generating a final visible near-infrared spectrum dictionary; wherein a phrase in the final visible near-infrared spectrum dictionary consists of adjacent words, and is a spatial linear segment in the chromaticity cone or a spatial curved segment in the chromaticity cone;

a sentence in the final visible near-infrared spectrum dictionary is formed by means of weighted combination of these words and phrases;

The method further comprises: performing weighted combination again on multi-scale spectral response curves corresponding to the consecutive point set, to form phrases in the final visible near-infrared spectrum dictionary; after discretizing a straight line set, performing weighted combination again on corresponding multi-scale spectral response curves to form phrases in the final visible near-infrared spectrum dictionary; and after discretizing a curve set, performing weighted combination again on corresponding multi-scale spectral response curves to form phrases in the final visible near-infrared spectrum dictionary.

Further preferably, the chromaticity coordinates are:

$r=R/(R+G+B+NIR); g=G/(R+G+B+NIR);$ $b=B/(R+G+B+NIR); nir=NIR/(R+G+B+NIR);$ wherein r, g, b, and nir respectively represent chromaticity coordinates corresponding to red, green, blue, and near-infrared, and R, G, B, and NIR are respectively stimulus values corresponding to red, green, blue, and near-infrared.

Further preferably, the construction method for a visible near-infrared spectrum dictionary further comprises the step of: inputting a visible near-infrared image comprising a target into a visible near-infrared computational spectrometry model on the basis of the final visible near-infrared spectrum dictionary, and calculating a visible near-infrared spectrum corresponding to target pixels, wherein an input of the visible near-infrared computational spectrometry model is a visible near-infrared image, and the visible near-infrared spectrum corresponding to the target pixels is outputted by using a constraint being that a near neighbor of an element in the target has a similar visible near-infrared spectrum, with reference to the shape of the spectral response curves of the four primary colors, the relative strength of association between the visible near-infrared image and the visible near-infrared spectrum, and spectral prior data of a target background, and by using, as an optimization function, the minimum difference between the sum of corresponding visible near-infrared spectra of an element of a target scene in the final visible near-infrared spectrum dictionary and the sum of corresponding four-band image intensities of the element in the visible near-infrared image, wherein the target is an object to be identified.

Further preferably, a method of acquiring the corresponding visible near-infrared spectra of the element of the target scene in the final visible near-infrared spectrum dictionary comprises:

classifying the target into a spot target, a multi-pixel target, and a morphological target, the spot target having less than hundreds of pixel points, the multi-pixel target having hundreds to thousands of pixel points, and the morphological target having thousands of pixel points or more;

using one visible near-infrared spectrum to express each pixel in the spot target, and using a single average spectrum curve of visible near-infrared spectra corresponding to the pixels to express the spot target;

using one visible near-infrared spectrum to express each pixel in the multi-pixel target, and using a plurality of visible near-infrared spectra or an average spectrum of the plurality of visible near-infrared spectra to express the multi-pixel target; and using one visible near-infrared spectrum to express each pixel in the morphological target, and using a plurality of visible near-infrared spectra or an average spectrum of the plurality of visible near-infrared spectra to express the morphological target.

According to another aspect, provided in the present invention is a construction system for a visible near-infrared spectrum dictionary, comprising:

a chromaticity cone construction module, for constructing a four-primary color chromaticity cone by using normalized spectral response curves of four primary colors of a visible light camera as spectral basis functions, wherein the four primary colors comprise: blue, green, red, and near-infrared, and each point in the four-primary color chromaticity cone is acquired by computing a weighted sum of the spectral basis functions; an initial visible near-infrared spectrum dictionary construction module, for performing weighted combination on the spectral basis functions and forming an initial visible near-infrared spectrum dictionary; a multi-scale spectrum curve construction module, for acquiring points on the four-primary color chromaticity cone on the basis of the initial visible red infrared spectrum dictionary according to different spectral resolutions and performing discretization, constructing multi-scale spectrum curves of the visible light camera, and forming words in the initial visible near-infrared spectrum dictionary, wherein the words in the spectrum dictionary represent discretized points of the chromaticity cone, and a scale size is a change in the spectral resolution; and a final visible near-infrared spectrum dictionary generation module, for clustering chromaticity coordinates corresponding to the words into different groups, performing weighted combination on multi-scale spectral response curves corresponding to different group types, generating phrases or sentences in the dictionary, adding the same to the initial visible near-infrared spectrum dictionary, and generating a final visible near-infrared spectrum dictionary.

Further preferably, the final visible near-infrared spectrum dictionary generation module comprises: a group type clustering unit and a group weighted-combination unit;

the group type clustering unit is for clustering the generated chromaticity coordinates into different groups, and the group types comprise a consecutive point set, a straight line set, and a curve set;

the group weighted-combination unit is for performing weighted combination again on multi-scale spectral response curves corresponding to the consecutive point set, to form phrases in the final visible near-infrared spectrum dictionary; after discretizing the straight line set, performing weighted combination again on corresponding multi-scale spectral response curves to form sentences in the final visible near-infrared spectrum dictionary; and after discretizing the curve set, performing weighted combination again on corresponding multi-scale spectral response curves to form sentences in the final visible near-infrared spectrum dictionary.

Further preferably, the chromaticity coordinates are:

$$r=R/(R+G+B+NIR); g=G/(R+G+B+NIR);$$

$$b=B/(R+G+B+NIR); nir=NIR/(R+G+B+NIR);$$

wherein r, g, b, and nir respectively represent chromaticity coordinates corresponding to red, green, blue, and near-infrared, and R, G, B, and NIR are respectively stimulus values corresponding to red, green, blue, and near-infrared.

Further preferably, the construction system for a visible near-infrared spectrum dictionary further comprises a target pixel corresponding visible infrared spectrum calculation module, for inputting a visible near-infrared image comprising a target into a visible near-infrared computational spectrometry model on the basis of the final visible near-infrared spectrum dictionary, and calculating a visible near-infrared spectrum corresponding to target pixels;

wherein an input of the visible near-infrared computational spectrometry model is a visible near-infrared image, and the visible near-infrared spectrum corresponding to the target pixels is outputted by using a constraint being that a near neighbor of an element in the target has a similar visible near-infrared spectrum, with reference to the shape of the spectral response curves of the four primary colors, the relative strength of association between the visible near-infrared image and the visible near-infrared spectrum, and spectral prior data of a target background, and by using, as an optimization function, the minimum difference between the sum of corresponding visible near-infrared spectra of an element of a target scene in the final visible near-infrared spectrum dictionary and the sum of corresponding four-band image intensities of the element in the visible near-infrared image.

Further preferably, a method of acquiring the corresponding visible near-infrared spectra of the element of the target scene in the final visible near-infrared spectrum dictionary comprises:

classifying the target into a spot target, a multi-pixel target, and a morphological target, the spot target having less than hundreds of pixel points, the multi-pixel target having hundreds to thousands of pixel points, and the morphological target having thousands of pixel points or more;

using one visible near-infrared spectrum to express each pixel in the spot target, and using a single average spectrum curve of visible near-infrared spectra corresponding to the pixels to express the spot target;

using one visible near-infrared spectrum to express each pixel in the multi-pixel target, and using a plurality of visible near-infrared spectra or an average spectrum of the plurality of visible near-infrared spectra to express the multi-pixel target; and using one visible near-infrared spectrum to express each pixel in the morphological target, and using a plurality of visible near-infrared spectra or an average spectrum of the plurality of visible near-infrared spectra to express the morphological target.

In general, compared with the prior art, the above technical solutions conceived by the present invention have the following beneficial effects:

In the construction method and system for a visible near-infrared spectrum dictionary provided in the present invention, spectral response curves of four primary colors (blue, green, red, and near-infrared) of a visible light camera are normalized first, and used as spectral basis functions, and a four-primary color chromaticity cone is formed. Then, the visible near-infrared spectrum dictionary is constructed by means of two main steps. The first step comprises: forming a generalized color vision for stimulus values generated by blue, green, and red (near-infrared) sensitive elements of the visible light camera, performing weighted combination on the spectral response curves of the four primary colors of the visible near-infrared sensor, the weighted combination being linear combination or non-linear combination; and on that basis, establishing a correspondence between the chromaticity cone and multi-scale spectrum curves. The second step comprises: performing discretization on the chromaticity cone according to a plurality of spectral resolutions, to form the chromaticity cone of the plurality of spectral resolutions (multi-scale). Points in the chromaticity cone of a certain spectral resolution represent words in the spectrum dictionary, and weighted combination is performed on a consecutive point cluster and a non-consecutive point cluster again to form phrases and sentences in the spectrum dictionary. The visible near-infrared spectrum dictionary achieved via the two main steps comprises a large amount of visible near-infrared spectra. The visible near-infrared spectrum dictionary can support a novel computational spectrometry imaging spectrometer.

In the construction method for a visible near-infrared spectrum dictionary provided in the present invention, different from the current ideas in the field of computational spectrometry imaging, for a chromaticity cone, spectral data of visible near-infrared bands is reconstructed by using existing chromaticity diagrams of four primary colors, i.e., red, green, blue, and near-infrared. The spectrum sensing characteristics of sensors are taken into full consideration. The method is better adapted to scenarios in which real-time computational spectrometry is required, and is worth being promoted for universal computational spectrometry.

DETAILED DESCRIPTION

To make the purpose, technical solution, and advantages of the present invention clearer, the present invention is further described in detail below in connection with the accompanying drawings and embodiments. It should be appreciated that the specific embodiments described here are used merely to explain the present invention and are not used to define the present invention.

The present invention establishes a visible light near-infrared four-primary color chromaticity cone model, constructs a visible light near-infrared sensor spectrum response dictionary, and has made breakthroughs in key technology such as timely processing of inversion models and methods of multi-band in association with computational spectrometry, system design, etc.

In visible light color imaging studies, a triple color combination was used to constitute hundreds of thousands of different colors, and the spectra corresponding to different colors may be considered to be different visible light spectra.

In color studies and measurement, a color is not always represented by the numbers of three primary colors, i.e., three stimulus values R, G, B, and a color may also be represented by respective ratios of the three stimulus values to the sum R+G+B of the three stimulus values. The respective ratios of the three stimulus values to the sum of the three stimulus values are referred to as chromaticity of colors. When red (R), green (G), and blue (B) are selected as three primary colors, r, g, and b are used to represent chromaticity coordinates. Definition is as follows:

$$r=R/(R+G+B); g=G/(R+G+B); b=B/(R+G+B);$$

wherein r+g+b=1, r is abscissa, and g is ordinate. Each point on a plane defined by r and g corresponds to a certain color. The plane capable of representing colors is referred to as a chromaticity diagram. Each point located on the chromaticity diagram and representing a color becomes a chromaticity point.

Three special chromaticity points are present on the chromaticity diagram, and coordinates thereof are respectively: r=1, g=b=0; g=1, r=b=0; b=1, r=g=0. The three special chromaticity points are respectively chromaticity points of the three primary colors red (R), green (G), and blue (B). When the three points are connected by lines, a triangle is formed. The interior of the triangle is a set of chromaticity points of all colors that can be generated by mixing the three primary colors according to different ratios. The triangle is referred to as the Maxwell color triangle. On the chromaticity diagram, the chromaticity points of respective spectral colors form a horseshoe curve, which is referred to as a spectral chromaticity locus.

Figure 1:
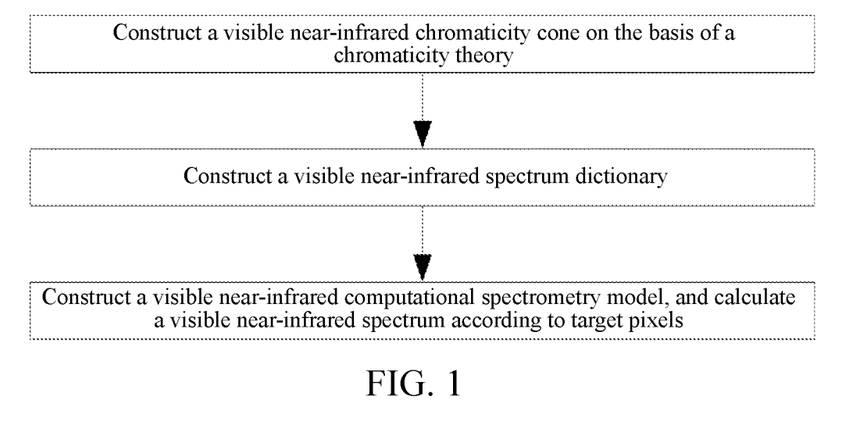
FIG. 1 is a schematic diagram showing a method for establishing a calculation model for a visible near-infrared spectrum dictionary according to an embodiment of the present invention.
Figure 2:
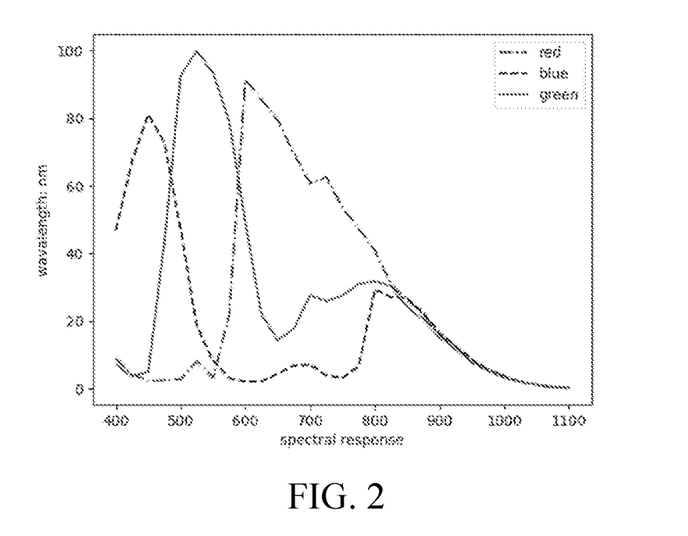
FIG. 2 shows spectral response curves of four primary colors of a visible light camera according to an embodiment of the present invention.
Figure 3:
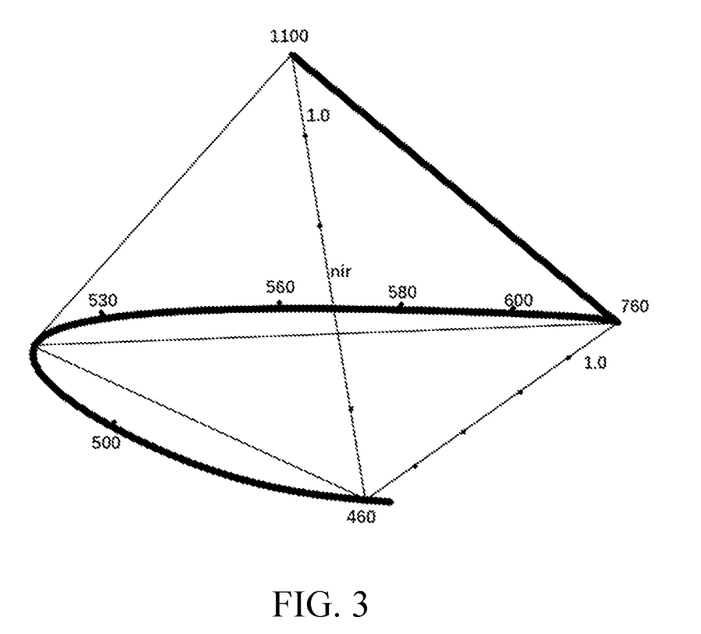
FIG. 3 shows a visible light/near-infrared four-primary color chromaticity cone according to an embodiment of the present invention.

According to an aspect, as shown in FIG. 1, provided in the present invention is a construction method for a visible near-infrared spectrum dictionary, including the following steps:

(1) Constructing a visible near-infrared chromaticity cone on the basis of the above chromaticity theory:

On the basis of spectral response curves of a visible light camera, as shown in FIG. 2, in four-primary color metric related to a visible near-infrared sensor, respective ratios of four stimulus values of the visible light camera to the sum R+G+B+NIR of the four stimulus values are used to represent a color. The visible near-infrared NIR may change separately as an independent variable. The respective ratios of the four stimulus values to the sum of the four stimulus values are extended chromaticity of visible near-infrared. When red (R), green (G), blue (B), and near-infrared (NIR) are selected as the four primary colors, r, g, b, and nir are used to represent extended chromaticity coordinates. Definition is as follows:

$$r=R/(R+G+B+NIR); g=G/(R+G+B+NIR);$$

$$b=B/(R+G+B+NIR); nir=NIR/(R+G+B+NIR);$$

where r+g+b+nir=1. The three primary colors of r, g, and b, and a near-infrared value corresponding to nir collectively form a four primary color extended chromaticity cone shown in FIG. 3. A certain spatial point in the chromaticity cone represents an extended chromaticity point in an extended color space.

Figure 4:
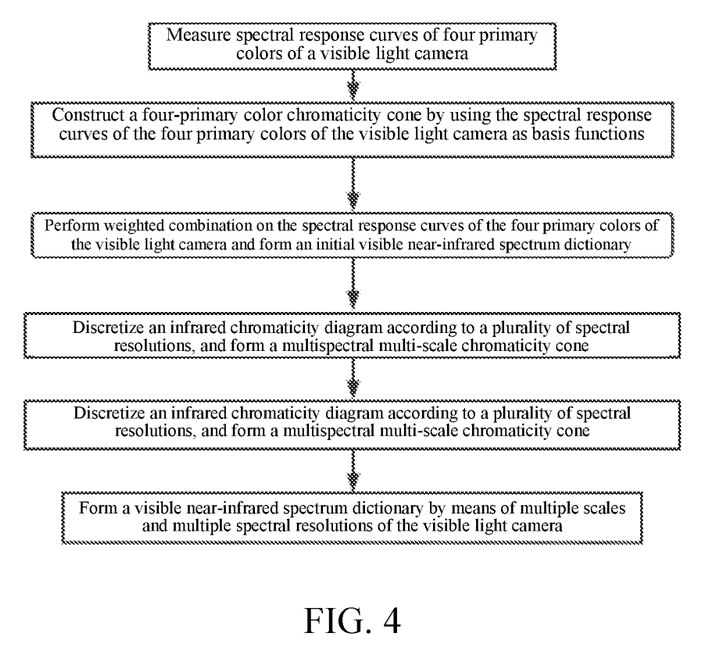
FIG. 4 is a schematic diagram showing a construction method for a visible near-infrared spectrum dictionary according to an embodiment of the present invention.

(2) As shown in FIG. 4, constructing a visible near-infrared spectrum dictionary:

(2.1) Performing weighted combination on spectral response curves of the four primary colors of the visible near-infrared sensor according to various scales, and forming an initial visible near-infrared spectrum dictionary;

wherein the scale is a step size of change in a weighting coefficient. A multi-scale visible near-infrared spectrum is discretized into a coarse-scale (a spectral resolution of 50 nm) spectrum, a medium-scale (a spectral resolution of 25 nm) spectrum, and a small-scale (a spectral resolution of 10 nm) spectrum. A visible near-infrared spectrum in the objective world may be words in the dictionary, or may also be a weighted combination of these words in the dictionary, which may be a linear weighted combination or a non-linear weighted combination;

this step is "few" to "many" mapping, and has the issue of multiple solutions. In order to acquire a unique reasonable feasible solution, it is necessary to use various laws, theorems, and constrains in a physical imaging process and various characteristics of an object to reasonably calculate in real time a unique, reasonable and feasible target visible near-infrared spectrum.

(2.2) Constructing a multi-scale spectrum of the sensor on the basis of different spectral resolutions, respectively acquiring points on the chromaticity cone according to spectral resolutions of 50 nm, 25 nm, and 10 nm, and constructing multi-scale spectrum curves of the visible near-infrared sensor.

(2.3) Acquiring points on the initial visible near-infrared chromaticity cone according to different spectral resolutions, performing discretization on the chromaticity cone, and constructing multi-scale spectrum curves of the visible near-infrared sensor, the scale size being a change in the spectral resolution.

(2.4) Clustering chromaticity coordinates generated by means of discretization performed according to the different spectral resolutions into different groups, performing weighted combination on spectral response curves corresponding to the chromaticity coordinates of different group types to generate words or phrases in the dictionary, adding the same to the initial visible near-infrared spectrum dictionary, and generating a final visible near-infrared spectrum dictionary.

The words in the spectrum dictionary are points acquired by performing discretization on the chromaticity cone.

A phrase in the spectrum dictionary consists of adjacent words, and may a spatial linear segment in the chromaticity cone or a spatial curved segment in the chromaticity cone.

A sentence in the spectrum dictionary is formed by means of weighted combination of these words and phrases.

(3) Constructing a visible near-infrared computational spectrometry model:

Inputting a visible near-infrared image, and outputting a visible near-infrared spectrum corresponding to target pixels.

The principle of the visible near-infrared computational spectrometry model is as follows:

From the perspective of the theory of radiation, red, green, blue, and near-infrared light is considered to be generated by radiation of a high temperature target object.

From the perspective of the theory of scattering and reflection, red, green, blue, and near-infrared light is considered to be some components of radiation of high temperature objects such as the sun, etc., scattered and reflected by a target object, and is therefore related to surface material characteristics and internal characteristics of the target object (including living and non-living objects).

From the perspective of the theory of chromaticity, it is considered that the three primary colors and extended four primary colors can be combined to form any color (i.e., any visible or near-infrared spectrum).

From the perspective of the design of visible near-infrared sensors, a visible near-infrared color camera can sense red, green, blue, and near-infrared light reflected or radiated by various objects. Each visible near-infrared sensor has one of four spectra corresponding thereto.

From the perspective of spatial relationship constraints of pixels, adjacent elements in each spatial sub-region in a target region in a visible near-infrared image have similar spectra, and different sub-regions have different spectra.

Visible near-infrared computational spectrometry inversion: which can be mathematically converted into an iterative constraint optimization problem, where an optimization criterion thereof is: a difference between the sum of spectrum curves (resulting from iterative query and calculation of the spectrum dictionary) of a certain element in a target scene and the sum of intensity of four-band images (acquired by an actual visible near-infrared sensor) corresponding to the element in a visible near-infrared image is minimum, and is subjected to the following constraints:
   a near neighbor of this element having similar spectra (typically satisfied in the case of homogeneity);
   the shape of a four-primary color spectral response curve of the visible near-infrared sensor;
   the relative strength of association between a four-band image and a visible near-infrared spectrum;
   segmentation and positioning of a sub-region in the four-band image and geometric coordinates of a homogeneous element;
   certain spectral priori knowledge of a target background, where the target background includes the sky, the land, and the sea.

It should be noted that the present invention provides a multi-resolution spectrum dictionary based on typical backgrounds, and also allows a background spectrum dictionary to be constructed on the basis of different spectral resolutions, so that the spectral resolution is adjustable.

In a multi-scale multi-resolution spectrum dictionary of a typical target, a method for acquiring a spectrum curve of the typical target comprises:
   a. a spot target having less pixels, where for this type of target, each pixel corresponds to one spectrum curve, and the spot target having less pixels may be expressed by using a single average spectrum curve of these pixels;
   b. a multi-pixel target, where for this type of target, each pixel corresponds to one spectrum curve, and the multi-pixel target needs to be expressed by multiple spectrum curves or by an average spectrum of multiple spectrum curves;
   c. a morphological target, where for this type of target, each pixel corresponds to one spectrum curve, and the morphological target needs to be expressed by multiple spectrum curves or by a group of average spectrum curves.

According to another aspect, provided in the present invention is a construction system for a visible near-infrared spectrum dictionary, including:
   a chromaticity cone construction module, for normalizing spectral response curves of four primary colors (blue, green, red, and near-infrared) of a visible light camera, using the same as spectral basis functions, and forming a four-primary color chromaticity cone;
   an initial visible near-infrared spectrum dictionary construction module, for forming, on the basis of various light field energies acquired by the visible light camera, a generalized color vision for different stimulus values generated by blue, green, and red (near-infrared) sensitive elements of the visible light camera; performing weighted combination on the spectral response curves of the four primary colors of the visible light camera, and forming an initial visible near-infrared spectrum dictionary, wherein the weighted combination may be linear or non-linear;
   a multi-scale spectrum curve construction module, for acquiring points on the initial visible near-infrared chromaticity cone according to different spectral resolutions, performing discretization on the chromaticity cone, and constructing multi-scale spectrum curves of the visible near-infrared sensor, the scale size being a change in the spectral resolution; and
   a final visible near-infrared spectrum dictionary generation module, for clustering chromaticity coordinates generated by means of discretization performed according to the different spectral resolutions into different groups, performing weighted combination on spectral response curves corresponding to the chromaticity coordinates of different group types to generate phrases or sentences in the dictionary, adding the same to the initial visible near-infrared spectrum dictionary, and generating a final visible near-infrared spectrum dictionary.

The words in the spectrum dictionary are points acquired by performing discretization on the chromaticity cone.

A phrase in the spectrum dictionary consists of adjacent words, and may a spatial linear segment in the chromaticity cone or a spatial curved segment in the chromaticity.

A sentence in the spectrum dictionary is formed by means of weighted combination of these words and phrases.

Further preferably, the final visible near-infrared spectrum dictionary generation module includes: a group type clustering unit and a group weighted-combination unit;
   the group type clustering unit is for clustering the generated chromaticity coordinates into different groups, and the group types include a consecutive point set, a straight line set, and a curve set;
   the group weighted-combination unit is for performing weighted combination again on multi-scale spectral response curves corresponding to the consecutive point set, to form the phrases in the final visible near-infrared spectrum dictionary; after discretizing the straight line set, performing weighted combination again on corresponding multi-scale spectral response curves to form the sentences in the final visible near-infrared spectrum dictionary; and after discretizing the curve set, performing weighted combination again on corresponding multi-scale spectral response curves to form the sentences in the final visible near-infrared spectrum dictionary.

Further preferably, the chromaticity coordinates are:

$$r=R/(R+G+B+NIR); g=G/(R+G+B+NIR);$$

$$b=B/(R+G+B+NIR); nir=NIR/(R+G+B+NIR);$$

wherein r, g, b, and nir respectively represent chromaticity coordinates corresponding to red, green, blue, and near-infrared, and R, G, B, and NIR are respectively stimulus values corresponding to red, green, blue, and near-infrared.

Further preferably, calculation of the final visible near-infrared spectrum dictionary is performed by using the visible near-infrared computational spectrometry model;
   wherein an input of the visible near-infrared computational spectrometry model is a visible near-infrared image, and the visible near-infrared spectrum corresponding to the target pixels is outputted by using a constraint being that a near neighbor of an element in the target has a similar visible near-infrared spectrum, with reference to the shape of the spectral response curves of the four primary colors, the relative strength of association between the visible near-infrared image and the visible near-infrared spectrum, and spectral prior data of a target background, and by using, as an optimization function, the minimum difference between the sum of visible near-infrared spectra of an element of a target scene and the sum of corresponding four-band image intensities of the element in the visible near-infrared image.

Further preferably, a method of acquiring the visible near-infrared spectrum corresponding to the target includes:

classifying the target into a spot target, a multi-pixel target, and a morphological target, the spot target having less than hundreds of pixel points, the multi-pixel target having hundreds to thousands of pixel points, and the morphological target having thousands of pixel points or more;

using one visible near-infrared spectrum to express each pixel in the spot target, and using a single average spectrum curve of visible near-infrared spectra corresponding to the pixels to express the spot target;

using one visible near-infrared spectrum to express each pixel in the multi-pixel target, and using a plurality of visible near-infrared spectra or an average spectrum of the plurality of visible near-infrared spectra to express the multi-pixel target; and using one visible near-infrared spectrum to express each pixel in the morphological target, and using a plurality of visible near-infrared spectra or an average spectrum of the plurality of visible near-infrared spectra to express the morphological target.

Figure 5:
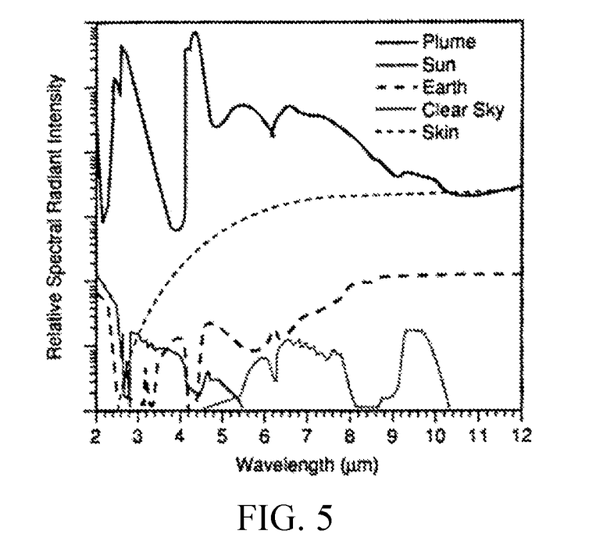
FIG. 5 is a schematic diagram showing the composition of spectral characteristics of an aircraft according to an embodiment of the present invention.

Blindness can be avoided by identifying various components of a moving target by means of images and constraining the computational spectrometry. The composition of an aircraft is used below as an example to analyze spectral characteristics thereof: as shown in FIG. 5, sources of radiation of spectral characteristics of an aircraft mainly include: reflected solar radiation (present in the daytime, and absent in the nighttime), reflected earth radiation, radiation from a gas input component of an engine, pneumatically heated skin radiation, radiation from hot components of an engine, and radiation of a wake flame.

Figure 6:
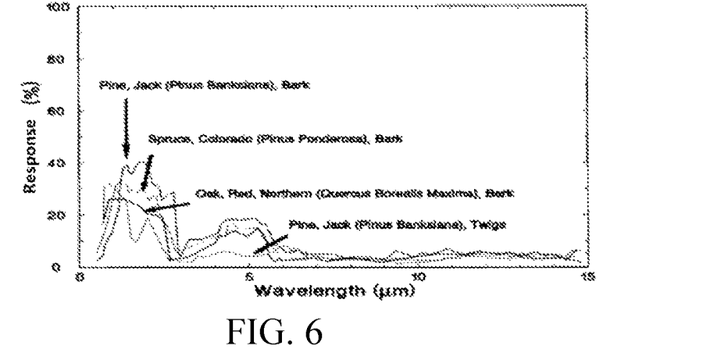
FIG. 6 is a schematic diagram of spectral computation inversion according to an embodiment of the present invention.

As shown in FIG. 6, the background spectra of various trees can be used to construct a new spectrum dictionary. In the drawing, pine represents a pine tree, spruce represents a spruce, and oak represents an oak tree.

Figure 7:
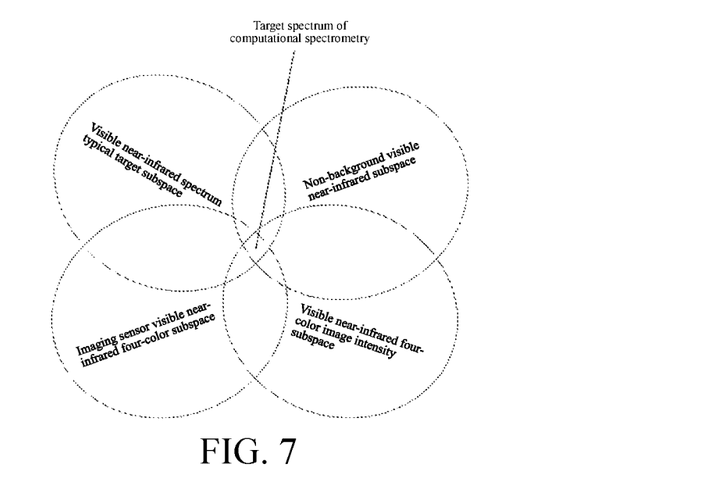
FIG. 7 shows a color (a scale of 0.05) corresponding to a spectrum curve generated when RGB are respectively set to 0.1, 0, and 0.65 according to an embodiment of the present invention.

Additional explanation of the spectrum dictionary is as shown in FIG. 7: the dictionary is arranged to have multiple levels and scales, and includes, after calibration, 1) the spectral response curves of the four primary colors of the infrared sensor; 2) the typical weighted combination curve sets (subspaces) of the four primary colors; 3) the background spectrum characteristic constraint model (the background spectrum subspace), which is spectral priori knowledge of the target background; 4) the typical target spectrum characteristic constraint model (the target subspace), which is spectral priori knowledge of the target background.

The non-applicable computational spectrometry problem is converted into applicable constraints on inversion calculation. The constraints include: the target spectrum curve is located in the target subspace of the target spectrum characteristic constraint model; the target spectrum curve is not located in the background spectrum subspace of the background spectral characteristic constraint model; and the target subspace shall be located in the subspace of the weighted combinations of the four primary colors of the visible near-infrared sensor.

The target described above is generally an object to be distinguished.

Regarding visible light RGB spectral response curves of the camera G3-CC10-C4095, different coefficients (the scales are 0.1 and 0.05, and the range is 0 to 1) are respectively set for the three RGB curves to perform weighted combination, and the spectral response curves of the sensor are updated. Conversion to the corresponding color is performed by using a chromatic formula.

Figure 8:
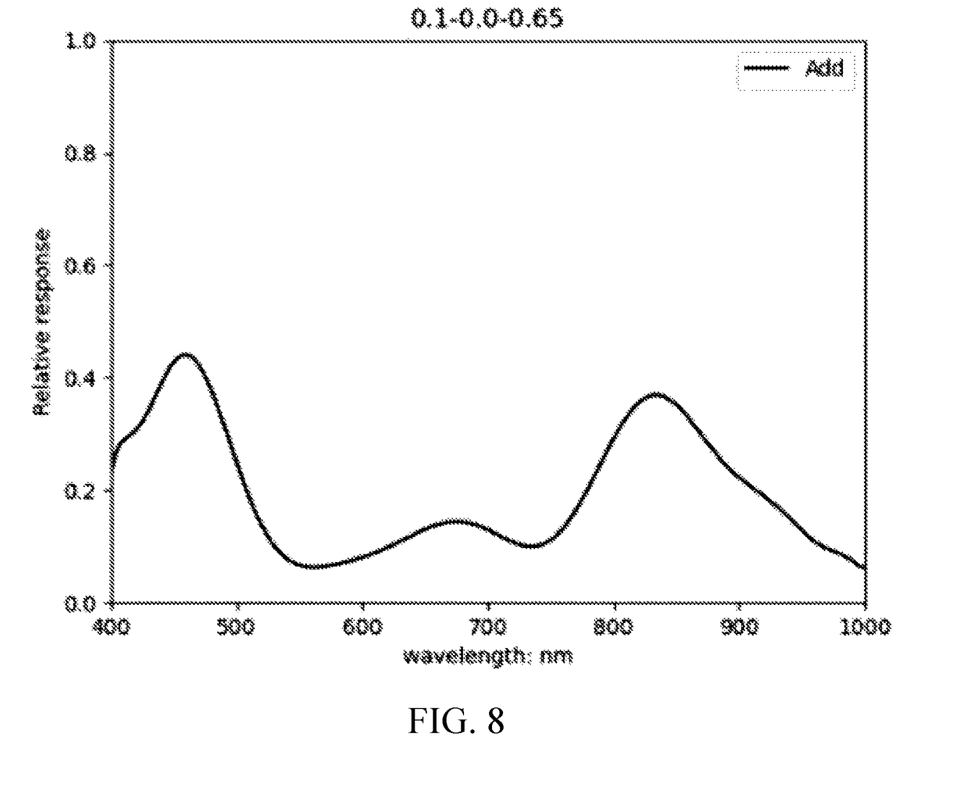
FIG. 8 is a schematic overall view of an RGB spectrum dictionary according to an embodiment of the present invention.

Some of the spectral response curves of the sensor are combined to generate the visible near-infrared spectrum dictionary. The dictionary currently includes 1770 curves in total. The visible near-infrared spectrum is as shown in FIG. 8.

The RGB curves are segmented. Some of curves generated by means of superposition performed by setting different weights are added to the site. Meanwhile, the dictionary includes 2912 curves in total.

In the construction method and system for a visible near-infrared spectrum dictionary provided in the present invention, spectral response curves of four primary colors (blue, green, red, and near-infrared) of a visible light camera are normalized first, and used as spectral basis functions, and a four-primary color chromaticity cone is formed. Then, the visible near-infrared spectrum dictionary is constructed by means of two main steps. The first step comprises: forming a generalized color vision for stimulus values generated by blue, green, and red (near-infrared) sensitive elements of the visible light camera, performing weighted combination on the spectral response curves of the four primary colors of the visible near-infrared sensor, the weighted combination being linear combination or non-linear combination; and on that basis, establishing a correspondence between the chromaticity cone and multi-scale spectrum curves. The second step comprises: performing discretization on the chromaticity cone according to a plurality of spectral resolutions, to form the chromaticity cone of the plurality of spectral resolutions (multi-scale). Points in the chromaticity cone of a certain spectral resolution represent words in the spectrum dictionary, and weighted combination is performed on a consecutive point cluster and a non-consecutive point cluster again to form phrases in the spectrum dictionary. The visible near-infrared spectrum dictionary achieved via the two main steps includes a large amount of visible near-infrared spectra. The visible near-infrared spectrum dictionary can support a novel computational spectrometry imaging spectrometer.

In the construction method for a visible near-infrared spectrum dictionary provided in the present invention, different from the current ideas in the field of computational spectrometry imaging, for a chromaticity cone, spectral data of visible near-infrared bands is reconstructed by using existing chromaticity diagrams of four primary colors, i.e., red, green, blue, and near-infrared. The spectrum sensing characteristics of sensors are taken into full consideration. The method is better adapted to scenarios in which real-time computational spectrometry is required, and is worth being promoted for universal computational spectrometry.

Those skilled in the art could easily understand that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A construction method for a visible near-infrared spectrum dictionary, characterized by comprising the following steps:

S1: constructing a four-primary color chromaticity cone by using normalized spectral response curves of four primary colors of a visible light camera as spectral basis functions, wherein the four primary colors comprise: blue, green, red, and near-infrared, and each point in the four-primary color chromaticity cone is acquired by computing a weighted sum of the spectral basis functions;

S2: performing weighted combination on the spectral basis functions and forming an initial visible near-infrared spectrum dictionary;

S3: acquiring points on the four-primary color chromaticity cone on the basis of the initial visible near-infrared spectrum dictionary according to different spectral resolutions and performing discretization, constructing multi-scale spectrum curves of the visible light camera, and forming words in the initial visible near-infrared spectrum dictionary, wherein the words in the spectrum dictionary represent discretized points of the chromaticity cone, and a scale size is a change in the spectral resolution; and S4: clustering chromaticity coordinates corresponding to the words into different groups, performing weighted combination on multi-scale spectral response curves corresponding to different group types, generating phrases or sentences in the dictionary, adding the same to the initial visible near-infrared spectrum dictionary, and generating a final visible near-infrared spectrum dictionary;

wherein a phrase in the spectrum dictionary corresponds to a spatial linear segment in the chromaticity cone or a spatial curved segment in the chromaticity cone.

2. The construction method according to claim 1, wherein the group types comprise a consecutive point set, a straight line set, and a curve set; and a method of performing weighted combination on multi-scale spectral response curves corresponding to chromaticity coordinates of different group types comprises:

performing weighted combination again on multi-scale spectral response curves corresponding to the consecutive point set, to form phrases in the final visible near-infrared spectrum dictionary;

after discretizing the straight line set, performing weighted combination again on corresponding multi-scale spectral response curves to form sentences in the final visible near-infrared spectrum dictionary; and after discretizing the curve set, performing weighted combination again on corresponding multi-scale spectral response curves to form sentences in the final visible near-infrared spectrum dictionary.

3. The construction method according to claim 1, wherein the chromaticity coordinates are:

$$r=R/(R+G+B+NIR); g=G/(R+G+B+NIR);$$

$$b=B/(R+G+B+NIR); nir=NIR/(R+G+B+NIR);$$

wherein r, g, b, and nir respectively represent chromaticity coordinates corresponding to red, green, blue, and near-infrared, and R, G, B, and NIR are respectively stimulus values corresponding to red, green, blue, and near-infrared.

4. The construction method according to claim 1, further comprising the following step: inputting a visible near-infrared image comprising a target into a visible near-infrared computational spectrometry model on the basis of the final visible near-infrared spectrum dictionary, and calculating a visible near-infrared spectrum corresponding to target pixels, wherein an input of the visible near-infrared computational spectrometry model is a visible near-infrared image, and the visible near-infrared spectrum corresponding to the target pixels is outputted by using a constraint being that a near neighbor of an element in the target has a similar visible near-infrared spectrum, with reference to the shape of the spectral response curves of the four primary colors, the relative strength of association between the visible near-infrared image and the visible near-infrared spectrum, and spectral prior data of a target background, and by using, as an optimization function, the minimum difference between the sum of corresponding visible near-infrared spectra of an element of a target scene in the final visible near-infrared spectrum dictionary and the sum of corresponding four-band image intensities of the element in the visible near-infrared image, wherein the target is an object to be identified.

5. The construction method according to claim 4, wherein a method of acquiring the corresponding visible near-infrared spectra of the element of the target scene in the final visible near-infrared spectrum dictionary comprises:

classifying the target into a spot target, a multi-pixel target, and a morphological target, the spot target having less than hundreds of pixel points, the multi-pixel target having hundreds to thousands of pixel points, and the morphological target having thousands of pixel points or more;

using one visible near-infrared spectrum to express each pixel in the spot target, and using a single average spectrum curve of visible near-infrared spectra corresponding to the pixels to express the spot target;

using one visible near-infrared spectrum to express each pixel in the multi-pixel target, and using a plurality of visible near-infrared spectra or an average spectrum of the plurality of visible near-infrared spectra to express the multi-pixel target; and using one visible near-infrared spectrum to express each pixel in the morphological target, and using a plurality of visible near-infrared spectra or an average spectrum of the plurality of visible near-infrared spectra to express the morphological target.

6. A construction system for a visible near-infrared spectrum dictionary, characterized by comprising:

a chromaticity cone construction module, for constructing a four-primary color chromaticity cone by using normalized spectral response curves of four primary colors of a visible light camera as spectral basis functions, wherein the four primary colors comprise: blue, green, red, and near-infrared, and each point in the four-primary color chromaticity cone is acquired by computing a weighted sum of the spectral basis functions;

an initial visible near-infrared spectrum dictionary construction module, for performing weighted combination on the spectral basis functions and forming an initial visible near-infrared spectrum dictionary;

a multi-scale spectrum curve construction module, for acquiring points on the four-primary color chromaticity cone on the basis of the initial visible near-infrared spectrum dictionary according to different spectral resolutions and performing discretization, constructing multi-scale spectrum curves of the visible light camera, and forming words in the initial visible near-infrared spectrum dictionary, wherein the words in the spectrum dictionary represent discretized points of the chromaticity cone, and a scale size is a change in the spectral resolution; and a final visible near-infrared spectrum dictionary generation module, for clustering chromaticity coordinates corresponding to the words into different groups, performing weighted combination on multi-scale spectral response curves corresponding to different group types, generating phrases or sentences in the dictionary, adding the same to the initial visible near-infrared spectrum dictionary, and generating a final visible near-infrared spectrum dictionary;

wherein a phrase in the spectrum dictionary corresponds to a spatial linear segment in the chromaticity cone or a spatial curved segment in the chromaticity cone.

7. The construction system according to claim 6, wherein the final visible near-infrared spectrum dictionary generation module comprises: a group type clustering unit and a group weighted-combination unit;

the group type clustering unit is for clustering the generated chromaticity coordinates into different groups, and the group types comprise a consecutive point set, a straight line set, and a curve set;

the group weighted-combination unit is for performing weighted combination again on multi-scale spectral response curves corresponding to the consecutive point set, to form phrases in the final visible near-infrared spectrum dictionary; after discretizing the straight line set, performing weighted combination again on corresponding multi-scale spectral response curves to form sentences in the final visible near-infrared spectrum dictionary; and after discretizing the curve set, performing weighted combination again on corresponding multi-scale spectral response curves to form sentences in the final visible near-infrared spectrum dictionary.

8. The construction system according to claim 6, wherein the chromaticity coordinates are:

$r=R/(R+G+B+NIR); g=G/(R+G+B+NIR);$ $b=B/(R+G+B+NIR); nir=NIR/(R+G+B+NIR);$ wherein r, g, b, and nir respectively represent chromaticity coordinates corresponding to red, green, blue, and near-infrared, and R, G, B, and NIR are respectively stimulus values corresponding to red, green, blue, and near-infrared.

9. The construction system according to claim 6, further comprising a target pixel corresponding visible near-infrared spectrum calculation module, for inputting a visible near-infrared image comprising a target into a visible near-infrared computational spectrometry model on the basis of the final visible near-infrared spectrum dictionary, and calculating a visible near-infrared spectrum corresponding to target pixels;

wherein an input of the visible near-infrared computational spectrometry model is a visible near-infrared image, and the visible near-infrared spectrum corresponding to the target pixels is outputted by using a constraint being that a near neighbor of an element in the target has a similar visible near-infrared spectrum, with reference to the shape of the spectral response curves of the four primary colors, the relative strength of association between the visible near-infrared image and the visible near-infrared spectrum, and spectral prior data of a target background, and by using, as an optimization function, the minimum difference between the sum of corresponding visible near-infrared spectra of an element of a target scene in the final visible near-infrared spectrum dictionary and the sum of corresponding four-band image intensities of the element in the visible near-infrared image.

10. The construction system according to claim 9, wherein a method of acquiring the corresponding visible near-infrared spectra of the element of the target scene in the final visible near-infrared spectrum dictionary comprises:

classifying the target into a spot target, a multi-pixel target, and a morphological target, the spot target having less than hundreds of pixel points, the multi-pixel target having hundreds to thousands of pixel points, and the morphological target having thousands of pixel points or more;

using one visible near-infrared spectrum to express each pixel in the spot target, and using a single average spectrum curve of visible near-infrared spectra corresponding to the pixels to express the spot target;

using one visible near-infrared spectrum to express each pixel in the multi-pixel target, and using a plurality of visible near-infrared spectra or an average spectrum of the plurality of visible near-infrared spectra to express the multi-pixel target; and using one visible near-infrared spectrum to express each pixel in the morphological target, and using a plurality of visible near-infrared spectra or an average spectrum of the plurality of visible near-infrared spectra to express the morphological target.

* * * * *